United States Patent
Kausik (10) Patent No.: US 7,047,281 B1
(45) Date of Patent: May 16, 2006

(54) METHOD AND SYSTEM FOR ACCELERATING THE DELIVERY OF CONTENT IN A NETWORKED ENVIRONMENT

(75) Inventor: Balas Natarajan Kausik, Los Gatos, CA (US)

(73) Assignee: Fineground Networks, Cupertino, CA (US)

( * ) Notice: Subject to any disclaimer, the term of this patent is extended or adjusted under 35 U.S.C. 154(b) by 788 days.

(21) Appl. No.: 09/634,134

(22) Filed: Aug. 8, 2000

(51) Int. Cl.
*G06F 15/16* (2006.01)

(52) U.S. Cl. ..................................... 709/213; 709/147

(58) Field of Classification Search ........ 709/200–203, 709/206, 217–219, 230, 246–247, 213–215; 711/118, 122, 137, 113, 147
See application file for complete search history.

(56) References Cited

U.S. PATENT DOCUMENTS

| | | | |
|---|---|---|---|
| 5,754,766 A | 5/1998 | Shaw et al. | 395/200.3 |
| 5,778,372 A | 7/1998 | Cordell et al. | 707/100 |
| 5,862,220 A | 1/1999 | Perlman | 380/21 |
| 5,880,740 A | 3/1999 | Halliday et al. | 345/435 |
| 5,918,239 A | 6/1999 | Allen et al. | 707/526 |
| 5,933,811 A | 8/1999 | Angles et al. | |
| 5,946,697 A * | 8/1999 | Shen | 715/513 |
| 6,006,227 A | 12/1999 | Freeman et al. | 707/7 |
| 6,011,905 A | 1/2000 | Huttenlocher et al. | 395/102 |
| 6,018,738 A | 1/2000 | Breese et al. | 707/100 |
| 6,038,573 A | 3/2000 | Parks | 707/513 |
| 6,078,917 A | 6/2000 | Paulsen, Jr. et al. | 707/6 |

(Continued)

FOREIGN PATENT DOCUMENTS

JP 02001034526 A 2/2001

(Continued)

OTHER PUBLICATIONS

Huican Zhu and Tao Yang, "Class-Based Cache Management for Dynamic Web Content,"Technical Report #TRCS00-13, Dept. of Computer Science, UCSB, published Jun. 2000; presented at IEEE InfoCOM Conference Apr. 2001; pp. 1-10.

(Continued)

*Primary Examiner*—Krisna Lim
(74) *Attorney, Agent, or Firm*—Schwegman, Lundberg, Woessner & Kluth, P.A.

(57) ABSTRACT

Many documents transmitted in a network environment contain substantial overlap with old versions of the same (or related) documents. For example, a "current news" web page may be updated hourly on a web site so that a new story is added and the oldest story is dropped. In such cases, it is inefficient to send the updated document in its entirety to a user requesting the new document but who had previously received the old web page. Instead, the new web document is first sent to a condenser, which replaces the unchanged portions of the new document with pointers to the old document. In this way, only the changed portions of the document need be transmitted to the user in their entirety. The condensed document is bound to the requesting user via a token such as a cookie generated by the condenser, and the condensed document and cookie are sent to the user. The user uses assembly software corresponding to the condensing process to reassemble the new document from the condensed document and the old document. The foregoing may be implemented on an individual user basis, as well as for classes of users.

35 Claims, 6 Drawing Sheets

U.S. PATENT DOCUMENTS

| | | | | |
|---|---|---|---|---|
| 6,085,234 | A | 7/2000 | Pitts et al. | 709/217 |
| 6,092,090 | A | 7/2000 | Payne et al. | 707/530 |
| 6,105,042 | A | 8/2000 | Aganovic et al. | 707/500 |
| 6,108,703 | A | 8/2000 | Leighton et al. | 709/226 |
| 6,128,655 | A | 10/2000 | Fields et al. | |
| 6,178,461 | B1 | 1/2001 | Chan et al. | 709/247 |
| 6,199,082 | B1 | 3/2001 | Ferrel et al. | |
| 6,230,171 | B1 | 5/2001 | Pacifici et al. | 707/512 |
| 6,247,050 | B1 | 6/2001 | Tso et al. | 709/224 |
| 6,249,844 | B1 * | 6/2001 | Schloss et al. | 711/122 |
| 6,466,999 | B1 | 10/2002 | Sliger et al. | |
| 6,490,601 | B1 | 12/2002 | Markus et al. | |
| 6,496,849 | B1 | 12/2002 | Hanson et al. | |
| 6,610,103 | B1 | 8/2003 | Ehrman et al. | |
| 6,622,168 | B1 * | 9/2003 | Datta | 709/219 |
| 6,697,844 | B1 * | 2/2004 | Chan et al. | 709/206 |
| 6,748,385 | B1 | 6/2004 | Rodkin et al. | |

FOREIGN PATENT DOCUMENTS

| | | |
|---|---|---|
| WO | WO 00/42519 | 7/2000 |

OTHER PUBLICATIONS

"Whitepapers," FineGround Networks, Inc., <http://www.fineground.com/prod/whitepaper.html>, 2001, p. 1.

"Deploying FineGround Condensers in an SSL Environment: A Technical White Paper," FineGround Networks, Inc., <http://www.fineground.com/prod/whitepaper.html>, 2001, pp. 1-5.

"Breaking New Ground in Content Acceleration: A Technical White Paper," FineGround Networks, Inc., <http://www.fineground.com/prod.whitepaper.html>, 2001, pp. 1-9.

"Network Products," Inktomi Corporation, <http://www.inktomi.com/products/network/products/tscclass.html>, 1996-2001, pp. 1-2.

"Network Products," Inktomi Corporation, <http://www.inktomi.com/products/network/products/cclass_works.html>, 1996-2001, pp. 1-2.

"Network Products," Inktomi Corporation, <http://www.inktomi.com/products/network/products/cclass_tech.html>, 1996-2001, pp. 1-5.

"Network Products," Inktomi Corporation, <http://www.inktomi.com/products/network/products/cclass_edge.html>, 1996-2001, pp. 1-2.

"Network Products," Inktomi Corporation, <http://www.inktomi.com/products/network/products/tseclass.html>, 1996-2001, pp. 1-2.

"Network Products," Inktomi Corporation, <http://www.inktomi.com/products/network/products/tsengine.html>, 1996-2001, pp. 1-4.

Aycock, John et al., "An architecture for easy web page updating", *Crossroads, 6*, ACM Digital Library copy,(1999), p. 1-7.

\* cited by examiner

METHOD AND SYSTEM FOR ACCELERATING THE DELIVERY OF CONTENT IN A NETWORKED ENVIRONMENT

FIELD OF THE INVENTION

The present invention teaches a method and apparatus for accelerating the delivery of content and reducing congestion in a networked environment. In particular, the present invention exploits the correlation between subsequent documents downloaded by one or more users.

BACKGROUND OF THE INVENTION

Consider a user who views a Web page at a news site at 10:00 a.m., and then visits it again at 11:00 a.m. Although there are some updates during this time, the Web page at 11:00 a.m. is largely the same as it is at 10:00 a.m. However, despite the common content between the pages at 11:00 a.m. and 10:00 a.m., in current implementations, the user's computer 100 downloads the entire page from the news site both times. This results in the inefficient utilization of network bandwidth between the user and the news site, creating network congestion and long download times.

The above situation is compounded by the fact that users often view the same page at the same site several times a day. To improve this situation, Internet Service Providers (ISPs) often deploy cache servers at various points in the network for storing frequently accessed content. For example, America Online (AOL) currently utilizes Inktomi's Traffic Server, a network caching platform, to speed up Web access for its users. When a user requests a Web page, the request is routed to the closet cache server in the network. If the requested Web page is located in the cache and is current, then the cache server delivers the page directly to the user without the need to access the Web server. By eliminating redundant network traffic between the cache server and the Web server, the cache server accelerates the delivery of content.

However, these cache servers suffer several limitations. First, cache servers do not reduce network delays between the cache server and the user. Additionally, cache servers are designed to exploit spatial correlation among multiple users. That is, a cache server is most effective when its contents are accessed by many users. As such, cache servers are not designed for and do not have the capacity to handle personalized content that is unique to every user. Finally, a cache server is only effective as long as its content remains current. Thus, cache servers cannot handle dynamically generated content that changes with time. It is not efficient to cache dynamically generated content since, by definition, such content will change upon subsequent retrievals.

The user's Web browser also employs a local cache for content that is repeatedly loaded in unchanged form into the browser. For example, browsers often cache image files, such as customized buttons, that make up part of a Web page. Both browser caches and network caches maintain the validity of their cached objects using hash and time-stamp verification. Specifically, when a cache receives a request for a cached object, the cache may verify the validity of the object by transmitting a binary time stamp of the cached object to the content server. The content server compares the transmitted value to that of its corresponding object. If the two values are equal, the content server signals the browser to load its own cached copy. If the two values are different, the content server sends a fresh copy of the object to the cache. Since transmission of a binary time-stamp of an object consumes significantly less bandwidth than transmission of the entire object, caches reduce network traffic between the cache and the content server. However, neither local caches nor cache servers can provide an adequate solution for access to the dynamically generated content that is so pervasive on modern networks.

Another technique to reduce network congestion is data compression. Files embedded in Web pages may be compressed using a data compression algorithm. For example, text files may be compressed using the Lempel-Ziv encoding algorithm, image files may be compressed using JPEG encoding, and digital audio and video files may be compressed using MPEG encoding. By transmitting files through the network in compressed form and decompressing them upon receipt by the user's browser, network bandwidth is efficiently utilized. Unfortunately, data compression as presently implemented only exploits the redundancies within a single web item, but not across multiple items that may be variations of the same item over time, or otherwise related to each other.

While data compression algorithms may not exploit redundancies between files, certain such algorithms do teach exploitation of redundancies between similar portions (for example, video frames or audio blocks) within a file. These compression algorithms use a variety of different techniques to exploit correlation within and across frames (or blocks) in order to reduce the number of bits required to represent an entire sequence of such frames. For example, in video compression, a predetermined sequence of video is decomposed into a series of frames, each frame comprising a still image. Digital audio is similarly processed, by breaking up the sequence into a series of blocks, each of which represents a predetermined time interval. The sequences must be predetermined because each frame is compressed by using information from its preceding or subsequent frames. These compression algorithms require frames to be reconstructed in the same order by all users. For this reason, such data compression algorithms cannot apply to the network situation where different users may demand different documents over randomly chosen time intervals and in random order.

Therefore, as discussed, caches do not offer an adequate solution to the problem of accelerating the delivery of dynamically generated and personalized content in a networked environment. Furthermore, data compression teachings for exploiting redundancies between frames or blocks in a single file do not apply well to exploiting redundancies between randomly accessed but similar (e.g. dynamically generated) files in a network. Thus, there remains a need for accelerating the delivery of content in a networked environment.

SUMMARY

The present invention allows for accelerating the delivery of content in a networked environment by storing a history of a sequence of documents and comparing the latest document in the sequence with the previous document(s) to enable the exploitation of correlation across these documents. However, as discussed earlier, unlike the prior art data compression solutions, the sequence of documents in the present invention need not be predetermined. Furthermore, unlike the prior art caching solutions, the present invention can handle documents that are dynamically generated. That is, caches are only effective when their content is current. Thus, caches cannot handle content that continually changes upon subsequent requests and is generated dynamically and personalized for each user. Examples of dynamically generated, personalized, and continually changing content are stock quotes, account information, personalized news feeds, etc. The benefits provided by the present invention include a substantial reduction in bandwidth usage, and/or a corresponding speed-up in the download performance of condensed documents for the user.

More particularly, various aspects of the present invention generate and transmit condensed documents that may be reconstructed (perhaps even automatically) upon reception by a user. Transmission of such condensed documents requires reduced use of network bandwidth, thereby freeing up bandwidth for other transmissions. Thus, an exemplary embodiment of the invention is directed to a so-called "condenser" disposed between a server and a user. The condenser receives a request for a first document from a user, receives the document from a content server, and binds the document to the user. Binding the document to the user may involve assigning and sending a token, such as a cookie, to the user, binding a copy of the token to the document, and then storing copies of the token and the document. The condenser then forwards the document to a memory accessible to the user. Such a memory may be a local user cache or a local network cache shared by a class of users. Later, the condenser receives a request for a second document from the user, receives the second document from the content server, retrieves the stored first document, and creates a condensed document by abbreviating redundant information in the second document relative to the first document. The condenser then transmits the condensed document to the user, who has access to corresponding software for reconstructing the second document using the first document. Such corresponding software may be included as a self-unwrapping program that is included in the transmission of the first or second document to the user. Such programs may be coded in languages such as Javascript, Java, Vbscript or other languages readily executed by popular content browsers.

In another aspect of the invention, the user is able to reassemble the second document using the condensed document and the first document. The user receives the condensed document and retrieves the first document from a locally accessible memory. As mentioned earlier, such a memory may be a local user cache or a network cache shared by a class of users. The user then uses assembly software corresponding to the condenser software to identify one or more reference(s) in the condensed document corresponding to sequence(s) in the first document, and to replace the reference(s) in the condensed document with the corresponding sequence(s) from the first document. Such assembly software may be transmitted from the condenser to the user's computer as a self-unwrapping program.

DETAILED DESCRIPTION

Figure 1:
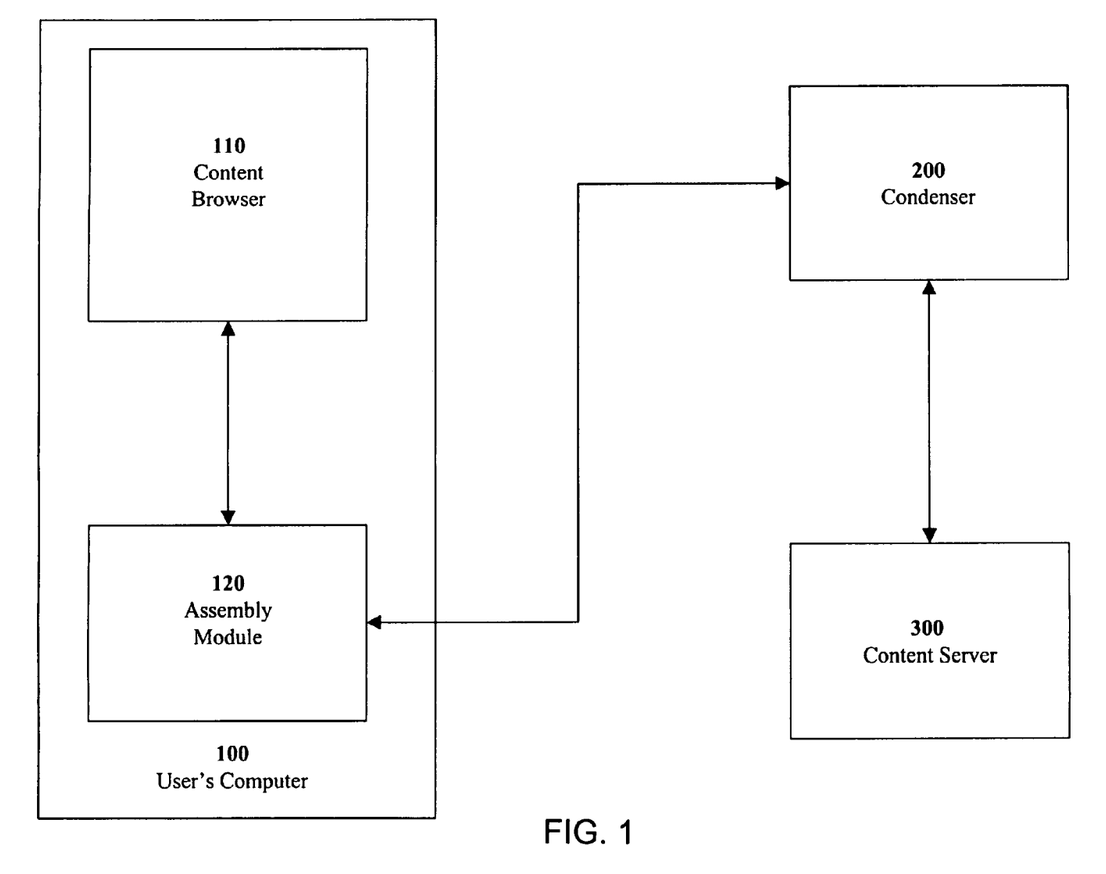
FIG. 1 is a block diagram illustrating an exemplary computer system for accelerating the delivery of content in a networked environment.

FIG. 1 is a block diagram illustrating an exemplary computer system for accelerating the delivery of content in a networked environment. For convenience, the invention will be described herein with respect to "documents," which should be understood to include any content-bearing items transmitted in a networked environment, including, without limitation, files, images, objects, programs, scripts, and other kinds of documents.

The system contemplates a network of computers and software running thereon including a user's computer 100, a condenser 200, and a content server 300. The user's computer 100 further includes a content browser 110 and an assembly module 120. The assembly module 120 may be implemented in many ways. In an exemplary embodiment, the condenser 200 ships the assembly module 120 as a self-unwrapping Javascript program to the user's computer 100 during an initial interaction between the condenser 200 and the user's computer 100. In alternate embodiments, the assembly module 200 may be implemented, without limitation, as preinstalled programs or "browser plug-ins," or with platform independent languages such as Java or scripting languages such as Javascript that are downloaded and executed on the fly. In this exemplary embodiment, the network is deployed over the Internet, although those skilled in the art will recognize that any public or private communication network including, without limitation, extranets, intranets, wireless networks and other telephonic or radio communications networks could also be used. Similarly, as used herein, the term computer refers to any device that processes information with an integrated circuit chip, including without limitation, mainframe computers, work stations, servers, desktop computers, portable computers, embedded computers, and hand-held computers.

In an exemplary embodiment of the invention, the condenser 200 may be operated by the same content provider that operates the content server or by a third party. The condenser 200 is configured transparently, as if it were a router so that all content to a content server 100 is directed through the condenser 200. Such a transparent configuration does not require manual configuration of the content browser 110 to direct traffic to the condenser 200. Those skilled in the art will recognize that nontransparent configurations, where manual configuration of the content browser 110 is necessary, may also be implemented in alternate embodiments. Additionally, this exemplary embodiment implements the condenser 200 as software running on a computer separate from any cache or content servers in the network. An exemplary embodiment situates the condenser 200 near content servers that may dynamically generate content such that network traffic between the condenser 200 and the user is minimized over a maximum length of network. Such a condenser 200 can serve multiple users by maintaining historic information about the pages most frequently requested by each user. However, those skilled in the art will recognize that the condenser 200 may be integrated into any cache or content server in the network. Those skilled in the art will also recognize that the condenser 200 may be also be implemented as various combination of software and/or hardware and integrated into lower level network connectivity devices, such as routers or switches.

Requesting and Retrieving Content

The process of requesting and receiving content, involving interactions among the content server, the condenser, and the user's computer, will now be described with reference to FIG. 2A (from the condenser's perspective) and FIG. 2B (from the user's perspective).

When a user's computer 100 initially requests a Web document from a content server 300 (FIG. 2B, step 2B10), the request is transparently transmitted to the condenser 200 (FIG. 2A, step 2A10) which recognizes that the request is the user's first request for such a Web document. The condenser 200 forwards the request to a content server 300 (FIG. 2A, step 2A20), which may be the Web server itself or an associated cache server. Upon receiving the request, the content server 300 generates or retrieves the Web page and sends it back to the condenser 200 (FIG. 2A, step 2A30). The condenser 200 stores a copy of the Web document (e.g. the HTML code) in its own cache (FIG. 2A, step 2A50), binds the copy to that specific user (FIG. 2A, step 2A40), and forwards a copy to the content browser 110 in the user's computer 100 (FIG. 2A, step 2A60). Binding of the copy to the user may be implemented, for example and without limitation, through cookie technology. In such a binding implementation, the condenser 200 generates and assigns a unique identifier or token to the specific user, binds the token to the copy of the Web document, stores this binding (FIG. 2A, step 2A50), and transmits the unique identifier in the form of a cookie (or other token or mechanism known to those skilled in the art) to the user's computer 100 (FIG. 2A, step 2A60). In subsequent interactions with the condenser, the content browser 110 in the user's computer 100 will preferably automatically forward the cookie to the condenser 200, enabling the condenser 200 recognize the user. In alternate embodiments, the condenser 200 may bind the copy to a class of users that share common characteristics. These common characteristics increase the chance that the users in the class will exhibit similar browsing behaviors and therefore request the same documents.

Figure 2A:
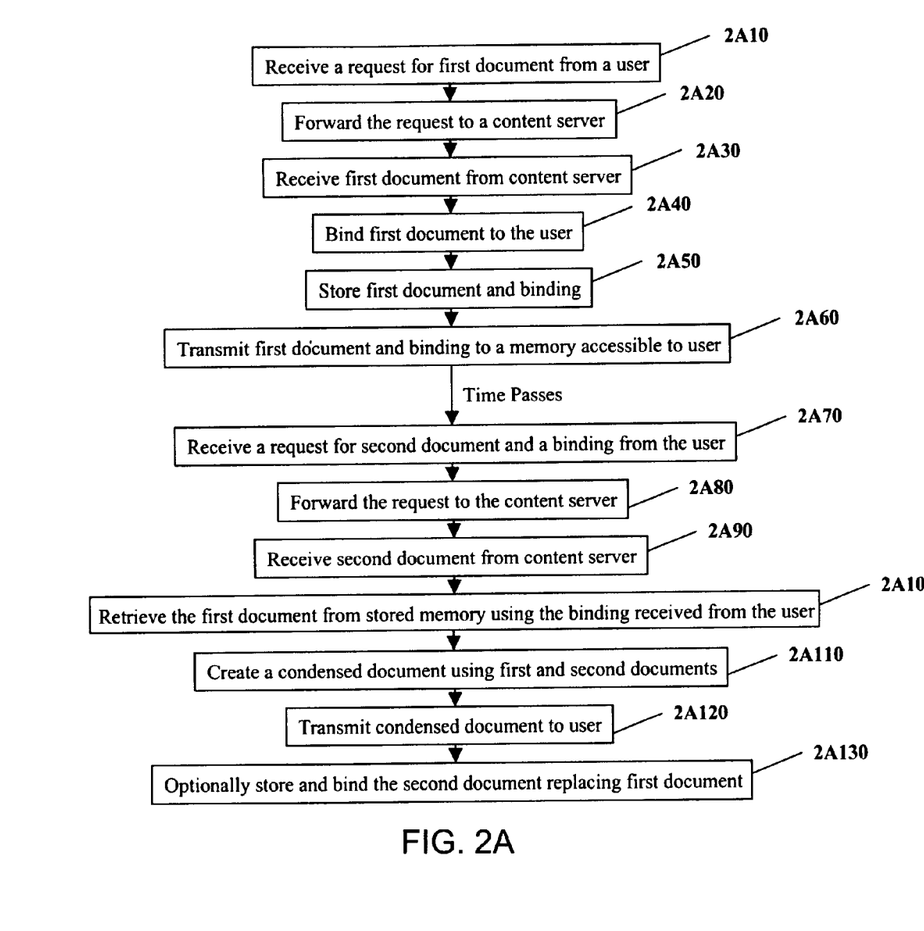
FIG. 2A is a flow chart illustrating an exemplary method from the perspective of the condenser.
Figure 2B:
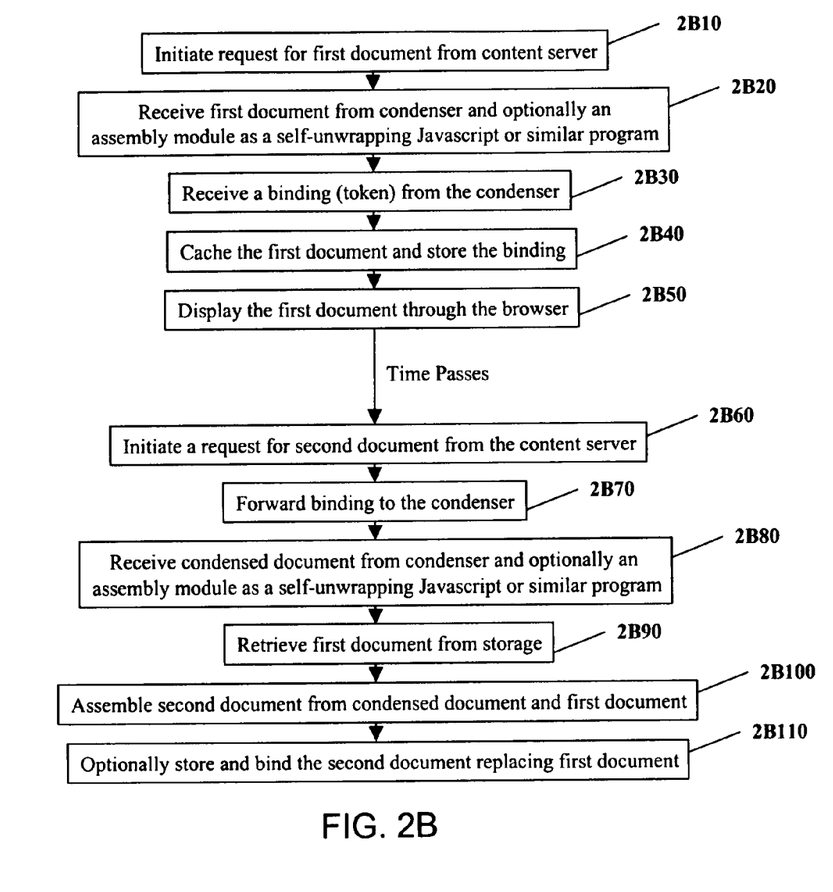
FIG. 2B is a flow chart illustrating an exemplary method from the perspective of the user's computer.

The content browser 110 receives the document (FIG. 2B, step 2B20) and the cookie (FIG. 2B, step 2B30), stores a copy of it in its local cache (FIG. 2B, step 2B40) and displays the document (FIG. 2B, step 2B50). In an embodiment implementing classes of users, network caches accessible to multiple users may choose to cache a copy of the document as well.

When the user's computer 100 subsequently requests the same Web document (which may since have slightly changed or updated) at a future time (FIG. 2B, step 2B60) via the condenser 200 (FIG. 2A, step 2A70), the condenser 200 recognizes (due to a cookie, or other form of binding, which may be received from the user if necessary (FIG. 2B, step 2B70)) that the user (or another user in the class) has received an earlier version of the document, retrieves the earlier version of the document (FIG. 2A, step 2A100), retrieves the new updated version of the document from the content server (FIG. 2A, steps 2A80 and 2A90), and performs a condensation process on the two Web documents (FIG. 2A, step 2A110). The result of the condensation process is a condensed document that is sent back to the user's computer 100 (FIG. 2A, step 2A120 and FIG. 2B, step 2B80), assembled by the assembly module 120 (FIG. 2B, step 2B100) using an earlier version of the document retrieved from memory (FIG. 2B, step 2B90), locally cached in its uncondensed form (FIG. 2B, step 2B 110), and ultimately displayed by the content browser 110.

The assembly module 120 accesses the local cache in the user's computer 100 (or the local network cache that is accessible to the entire class) in order to reassemble the condensed document. Preferably, the local cache still contains a copy of the first version of the Web document from the first request. If the local cache does not contain such a copy (e.g. the local cache has been flushed), the user's computer 100 may transmit a request for another copy of the first version of the document which is then received and used to reassemble the condensed document.

If the new version of the document has been updated or changed, its decomposition will produce new fragments that consist entirely of new material and old fragments that match certain fragments of the prior version. Because the prior version of the document is also locally cached at the user's computer 100, the old fragments are already resident on the user's computer 100. Therefore, the condenser 200 simply transmits the new fragments and a list of pointers to the old fragments to the user's computer 100. The combination of new fragments and the list of pointers typically requires substantially fewer bits than the entire document.

Details of the Condensation Process

As discussed earlier, the condenser 200 performs the condensation process when it receives a second request for a document from the user's computer 100 (FIG. 2A, step 2A70, FIG. 2B, step 2B60). The condenser 200 retrieves (FIG. 2A, step 2A90) and fragments (FIG. 2A, step 2A110) this second version of the document (hereinafter, "document B") by comparing it to the first version of the document (hereinafter, "document A"). This comparison results in a condensed document (hereinafter, "document C") which is transmitted to the user's computer 100. Note that the fragments are created to maximize network utilization, and thus need not necessarily be semantically meaningful or natural objects such as images, audio, or video. Further details of the condensation process (especially regarding fragmentation) are set forth below.

Figure 3:
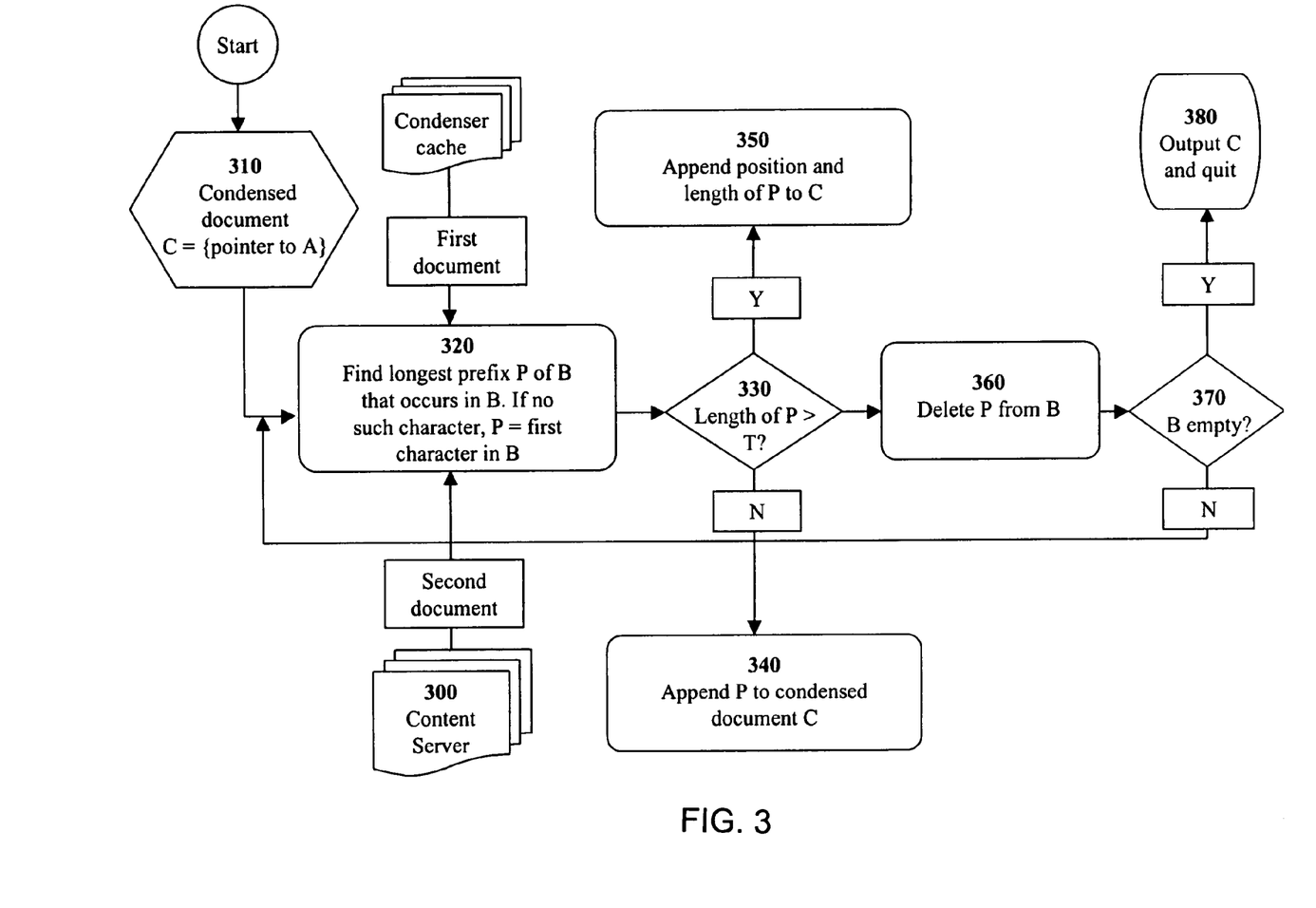
FIG. 3 is a flow chart illustrating an exemplary method for the condensation process.

Referring to FIG. 3, at step 310, document C is initialized to contain a pointer to document A. Such a pointer is typically a network address or a URL, but may include any other form of identifier known to those skilled in the art. At step 320, the condenser 200 finds the longest prefix P, starting from the beginning of document B, that occurs in document A. Hashing methods such as popular implementations of Lempel-Ziv and other text compression algorithms will efficiently find the longest prefix P. Assume that there is a prefix P of document B that occurs in document A, and further suppose that prefix P is of length L characters. At step 330, L is compared to a threshold parameter T of value at least 2. If L is not greater than T, then at step 340, the entire string P is appended to C without alteration. Now suppose that L is greater than T. Suppose further that P occurs in document A at position S. Then, at step 350, the string "(S,L)" is appended to document C in place of prefix P. When document C is ultimately transmitted to the assembly module 120, the assembly module 120 knows that the two characters "(" and ")" are special characters used for parsing. As shown, the threshold parameter T may be selected so that very small prefixes are not replaced by strings of the form "(S,L)" which are longer than the prefix themselves, resulting in a net increase in the number of bits required to transmit document B. Thus, for efficiency reasons, T is often selected to be 4 or greater. The foregoing all assumes that there is some prefix P that occurs in both documents A and B. If there is no prefix P of document B that occurs in document A, then the first character in document B is simply appended to document C (the first character effectively serves as a prefix P of length 1).

At step 360, the prefix string P is deleted from document B. At step 370, it is determined whether document B is empty. If document B is empty, at step 380, the process terminates and transmits document C to the assembly module 120 in the user's computer 100. Otherwise, if document B is not empty, the process iterates, returning to step 320. The foregoing describes a process for constructing a new document C from an initially blank state. More generally, document C could be constructed by replacing, within (e.g., in a copy of) document B, each string (above some threshold size) in document B that is also found in document A with that string's corresponding position and length from document A.

At the end of the above process for constructing document C, the condenser may optionally store and bind document B to the user.

The foregoing exemplifies the invention in terms of documents composed of characters. However, those skilled in the art will recognize that the invention also applies to documents composed of other primitives, such as pixels or blocks of pixels in the case of images. Specifically, in the case of images, images A and B are broken up into sequences of blocks of, for example, 4×4 pixels. The blocks in image B are examined in sequence, and if a block in image B is sufficiently close to a block in image A, the position of the block in image A is transmitted rather than the block itself.

Unlike traditional techniques for compressing images, such as vector quantization, the condensation process does not need to transmit a codebook to reconstruct image B. In a typical prior art scenario, vector quantization operates on an original reference image, selecting a set of blocks from the original reference image to form a codebook. Thenceforth, vector quantization replaces each block in a subsequent image by a block in the codebook that best approximates the block, thereby creating a compressed form of the image. A content server must transmit the entire codebook, together with the list of indices into the codebook that represents the sequence of blocks in the subsequent image, to ensure that the recipient can reconstruct the image. A disadvantage of the vector quantization is that the quality of the compression as well as the reconstructed image depends on the size of the codebook. That is, a small codebook will result in substantial compression but poor image quality, while a large codebook will provide good image quality but relatively little compression. In contrast to vector quantization, the condensation process operates on a pair of images, and reuses any possible block in the first image to approximate the blocks in the second image. Since the first image (image A) has already been transmitted and cached at the user's computer 100, it is unnecessary to transmit a codebook.

Details of the Assembly Process

Figure 4:
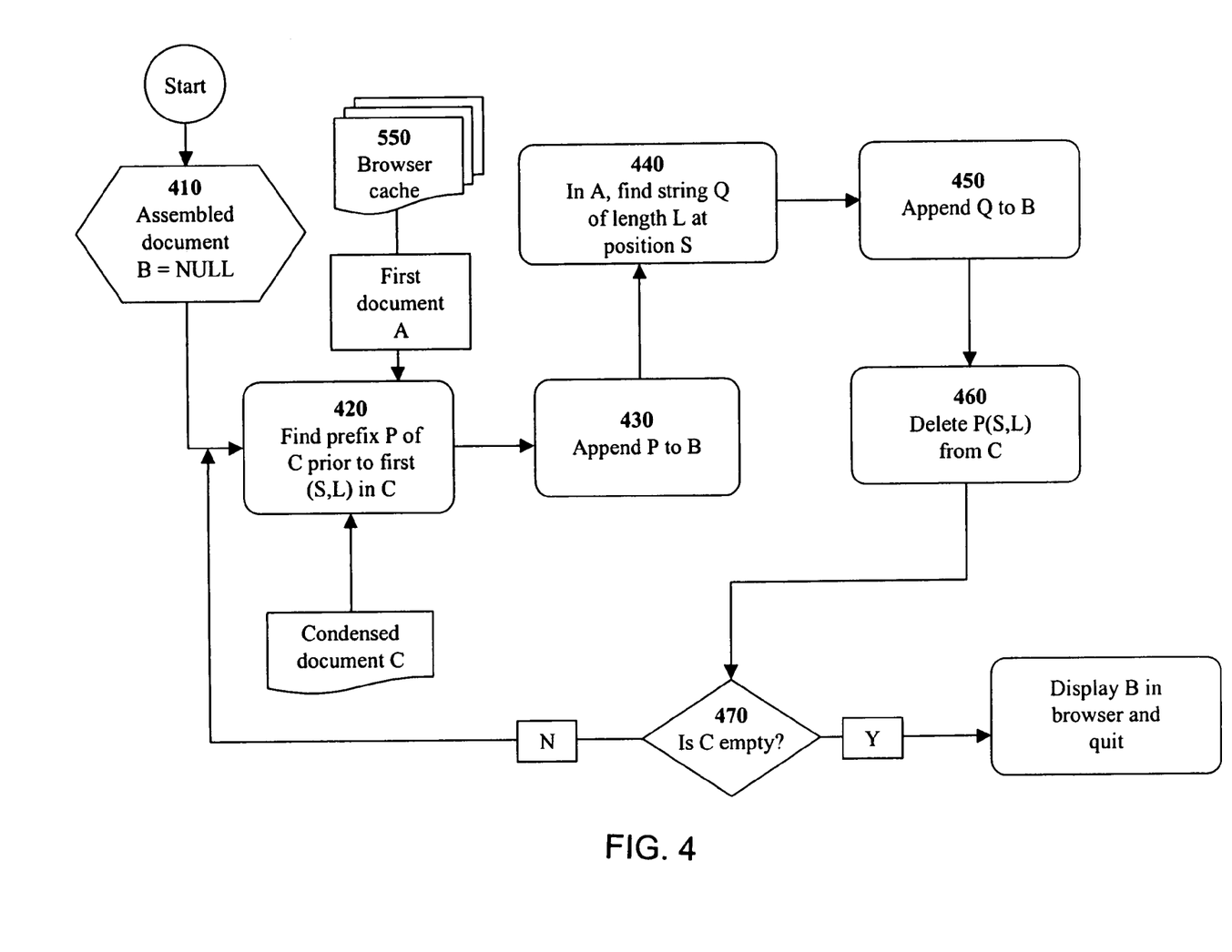
FIG. 4 is a flow chart illustrating an exemplary method for the assembly process.

Once the assembly module 120 receives document C, it begins the assembly process to reconstruct document B. Referring to FIG. 4, at step 410, document B begins as an empty (NULL) document. The assembly module 120 then retrieves a copy of document A from the local cache in the user's computer 100 (or the network cache accessible to a class of users) by referencing the pointer, provided by document C, to document A. If the local cache has already flushed document A, the user's computer 100 may request document A from the condenser. At step 420, the assembly module 120 identifies the prefix P (if any) in document C prior to the first occurrence of a string of the form "(S,L)". At step 430, this prefix P is appended to document B. At step 440, the assembly module 120 finds the string (let's call it Q) in document A starting at position S and continuing for length L and, at step 450, appends the string Q to document B. At step 460, the string P(S,L) (i.e., both prefix P and the pointer (S,L)) is deleted from document C. At step 470, if document C is not empty, the assembly module 120 iterates the process, returning to step 420. Otherwise, if document C is empty, the assembly module 120 sends document B, now fully reconstructed, to the content browser 110 to display to the user. At the end of the above process, the content browser 110 may optionally cache document B. Thus, when a third document C is condensed with respect to document B by the condenser 200, the assembly module 120 can reassemble document C with respect to document B.

Example of Operation Involving Text Documents

Figure 5:
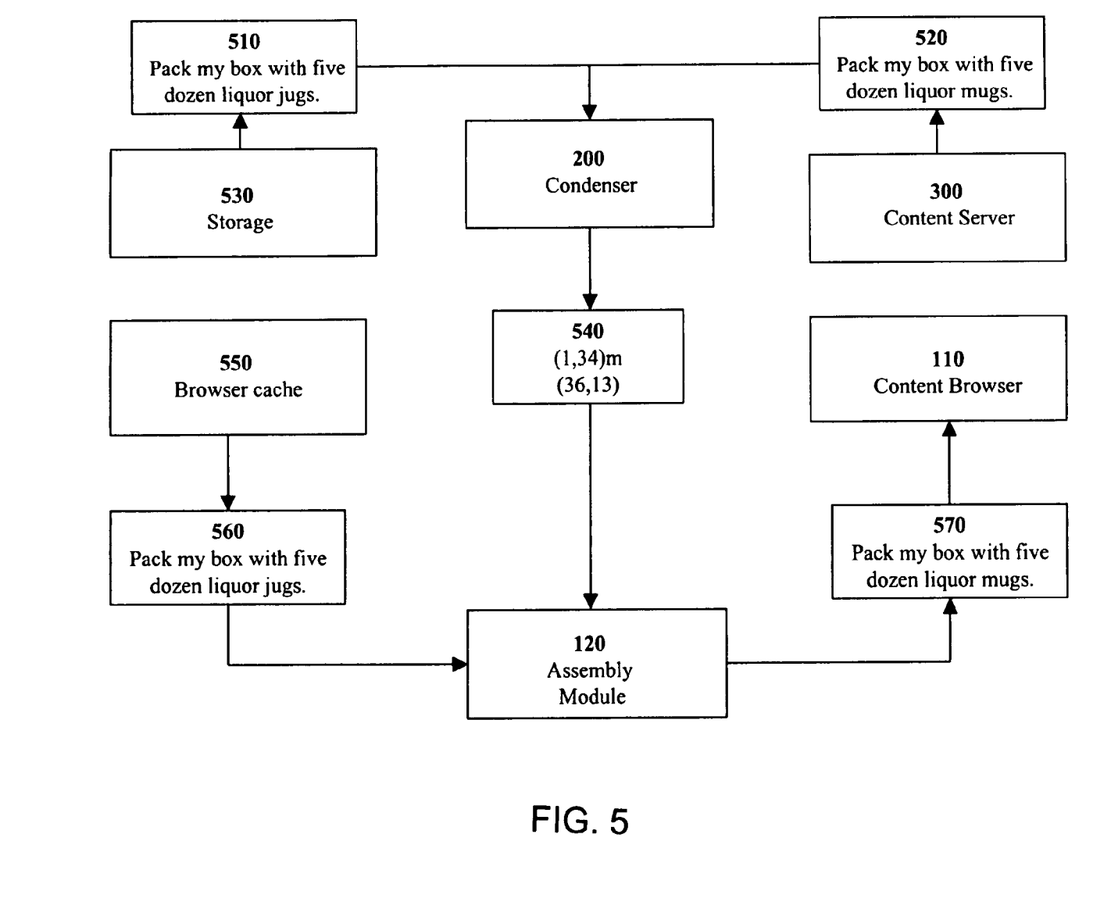
FIG. 5 is a block diagram illustrating an exemplary computer system for accelerating the delivery of content in a networked environment involving text documents.

FIG. 5 depicts a specific example of operation of the aforementioned embodiments where the documents are text documents. In this example, the original document 510 requested by the user initially contains the phrase, "pack my box with five dozen liquor jugs." The condenser 200 caches a copy of the original document 510 in storage 530 before sending it to the user's computer 100. Subsequently, the document is changed and the user makes a request for the changed document. As shown in 520, the document has slightly changed and now contains the phrase, "pack my box with five dozen liquor mugs." The condenser 200 retrieves the changed document 520 from the content server 300 and compares it with the cached original document 510 in its storage 530. Using the condensation process described earlier, the condenser 200 determines that characters 1 through 35 and characters 37 through 40 of the original document 510 are same as those of the changed document 520. The two documents differ only at character position 36, where the character "m" occurs in the changed document 520 as compared to the character "j" in the original document. The condenser 200 constructs a (14-character) condensed message "(1,35)m(37,4)" 540 to represent the changed character surrounded by unchanged text, and transmits the condensed message 540 to the user's computer 100. The assembly module 120 on the user's computer 100 interprets this message 540 by retrieving a copy of the original document 560 from its own cache 550, and assembles the changed document 570 as the sequence of characters comprising the first 35 characters of the original document 560, followed by the single character "m" and then the 4 characters starting at position 37 of the original document 560. Taken together this sequence of characters forms the changed document 570 and is ultimately displayed on the user's content browser 110. The condenser 200 has thus effectively transmitted the changed document 520 with substantially fewer characters (14 characters) than the changed document 520 actually contains (40 characters) itself. The process accelerates the delivery of the changed document 520 resulting in a substantial reduction in transmission time and network traffic.

The various embodiments described above should be considered as merely illustrative of the present invention. Those skilled in the art will realize that the present invention is applicable regardless of whether the user is a person at a computer, or a network device such as a cache or proxy agent. Those skilled in the art will realize that the present invention is also applicable to the full range of data forms transmitted on the Internet, including but not limited to text, images, video and audio. Thus the various embodiments described above are not intended to be exhaustive or to limit the invention to the forms disclosed. Those skilled in the art will readily appreciate that still other variations and modifications may be practiced without departing from the general spirit of the invention set forth herein. Therefore, it is intended that the present invention be defined by the claims that follow.

What is claimed is:

1. A method for improving network efficiency comprising the steps of:
   (a) receiving a request for a first document from a user;
   (b) receiving said first document from a content server;
   (c) binding, at a condenser at a network location between the user's computer and said content server, said first document to said user;
   (d) storing said first document at said condenser;
   (e) forwarding said first document to a memory accessible to said user;
   (f) receiving a request for a second document from a user;
   (g) receiving a second document from said content server;
   (h) retrieving said first document bound to said user;
   (i) creating a condensed document by abbreviating redundant information in said second document relative to said first document; and
   (j) transmitting said condensed document to said user, enabling said user to reconstruct said second document using said first document.

2. The method of claim 1 wherein said binding step (c) further comprises: (c1) creating, at said condenser, said binding between the user and said first document; and (c2) creating a directly corresponding binding for said user's computer.

3. The method of claim 2 wherein said binding step (c) comprises the use of a token associated with said user.

4. The method of claim 1 wherein said creating step (i) further comprises:
   (i1) identifying at least one common sequence shared by said first document and said second document;
   (i2) replacing at least one common sequence in said second document with a reference to a corresponding sequence in said first document; and
   (i3) retaining unreplaced sequences in said second document.

5. The method of claim 4 wherein said reference includes a length corresponding to said common sequence and a location in said first document corresponding to said common sequence.

6. The method of claim 1 implemented at a content server.

7. The method of claim 1, further comprising the step (k) of replacing said first document with said second document for use as a reference in a subsequent user request.

8. The method of claim 1 wherein said first document and said second document are time-varying, dynamically generated documents.

9. The method of claim 1 wherein said binding step binds said first document to a class of users.

10. The method of claim 9 wherein said users in said class share common characteristics.

11. The method of claim 1 wherein software for reconstructing said second document is included in a transmission to said user of said first document or said condensed document.

12. The method of claim 11 wherein said software for reconstructing said second document is a self-unwrapping program.

13. The method of claim 1 implemented in a network connectivity device.

14. The method of claim 1 wherein said memory is local to said user.

15. The method of claim 1 wherein said memory is a local network memory shared by said class of users.

16. A condenser, located at a network location between a user's computer and a content server, for improving downstream network efficiency, said condenser comprising:
   (1) a processor;
   (2) a memory connected to said processor storing a program to control the operation of said processor;
   (3) the processor operative with said program in said memory to:
      (a) receive a request for a first document from a user;
      (b) receive said first document from said content server;
      (c) bind, at said condenser, said first document to said user;
      (d) store said first document;
      (e) forward said first document to a memory accessible to said user;
      (f) receiving a request for a second document from a user;
      (g) receive a second document from said content server;
      (h) retrieve said first document bound to said user;
      (i) create a condensed document by abbreviating redundant information in said second document relative to said first document; and
      (j) transmit said condensed document to said user, enabling said user to reconstruct said second document using said first document.

17. The condenser of claim 16 wherein said processor is further operative with said program to create a binding for said condenser and a directly corresponding binding for said user.

18. The condenser of claim 16 wherein said processor, operating with said program to create said condensed document, is further operative with said program to:
   (i1) identify at least one common sequence shared by said first document and said second document;
   (i2) replace at least one common sequence in said second document with a reference to a corresponding sequence in said first document; and
   (i3) retain unreplaced sequences in said second document.

19. The condenser of claim 16 wherein said first document and said second document are non-cacheable, dynamically generated documents.

20. The condenser of claim 16 wherein said processor is further operative with said program to send software for reconstructing said second document in a transmission to said user of said first document or said condensed document.

21. A computer-readable storage medium encoded with processing instructions for implementing a method for improving network efficiency, said processing instructions for directing a computer to perform the steps of:
   (a) receiving a request for a first document from a user;
   (b) receiving said first document from a content server;
   (c) binding, at a condenser at a network location between the user's computer and said content server, said first document to said user;
   (d) storing said first document;
   (e) forwarding said first document to a memory accessible to said user;
   (f) receiving a request for a second document from a user;
   (g) receiving a second document from said content server;
   (h) retrieving said first document bound to said user;
   (i) creating a condensed document by abbreviating redundant information in said second document relative to said first document; and
   (j) transmitting said condensed document to said user, enabling said user reconstruct said second document using said first document.

22. The computer-readable storage medium of claim 21 wherein said binding step (c) further comprises creating a binding for a condenser and a directly corresponding binding for said user.

23. The computer-readable storage medium of claim 21 wherein said creating step (i) further comprises:
   (i1) identifying at least one common sequence shared by said first document and said second document;
   (i2) replacing at least one common sequence in said second document with a reference to a corresponding sequence in said first document; and
   (i3) retaining unreplaced sequences in said second document.

24. The computer-readable storage medium of claim 21 wherein said first document and said second document are non-cacheable, dynamically generated documents.

25. The computer-readable storage medium of claim 21 further comprising instructions for sending software for reconstructing said second document in a transmission to said user of said first document or said condensed document.

26. A method for reassembling a condensed document from a first document, the method comprising the steps of:
   (1) receiving said condensed document;
   (2) retrieving said first document from a locally accessible memory, said first document being previously bound to a user by a condenser at a network location between the user's computer and a content server;
   (3) identifying at least one reference in said condensed document corresponding to a sequence in said first document; and
   (4) replacing at least one reference in said condensed document with said corresponding sequence in said first document, thereby creating a reassembled document.

27. The method of claim 26 further comprising the step of replacing said first document with said reassembled document in said locally accessible memory.

28. The method of claim 26 implemented as a self-unwrapping program.

29. The method of claim 26 implemented at a user's computer.

30. The method of claim 26 wherein said locally accessible memory is shared by a class of users with common characteristics.

31. A system for reassembling a condensed document from a first document, said device comprising:
   (1) a processor;
   (2) a memory connected to said processor storing a program to control the operation of said processor; and
   (3) the processor operative with said program in said memory to:
      (a) receive said condensed document;
      (b) retrieve said first document from a locally accessible memory, said first document being previously bound to a user by a condenser at a network location between the user's computer and a content server;
      (c) identify at least one reference in said condensed document corresponding to a sequence in said first document; and
      (d) replace at least one reference in said condensed document with said corresponding sequence in said first document, thereby creating a reassembled document.

32. The system of claim 31 configured to be deployed at a user's computer.

33. The system of claim 31 wherein said locally accessible memory is shared by a class of users with common characteristics.

34. A computer-readable storage medium encoded with processing instructions for implementing a method for reassembling a condensed document from a first document, said processing instructions for directing a computer to perform the steps of:
   (a) receiving said condensed document;
   (b) retrieving said first document from a locally accessible memory, said first document being previously bound to a user by a condenser at a network location between the user's computer and a content server;
   (c) identifying at least one reference in said condensed document corresponding to a sequence in said first document; and
   (d) replacing at least one reference in said condensed document with said corresponding sequence in said first document, thereby creating a reassembled document.

35. The computer-readable storage medium of claim 34 wherein said locally accessible memory is shared by a class of users with common characteristics.

* * * * *